Feb. 23, 1971  A. B. EIRINBERG ET AL  3,565,489

DECORATIVE WHEEL DISC

Filed Dec. 5, 1968

Inventors:
Alan B. Eirinberg
Julius Sirbu
By Gary Parker,
Juettner, Pigott & Cullinan
Attys

United States Patent Office 3,565,489
Patented Feb. 23, 1971

3,565,489
DECORATIVE WHEEL DISC
Alan B. Eirinberg, Northbrook, Ill., and Julius Sirbu, East Chicago, Ind., assignors to Sales Plus, Inc., Chicago, Ill., a corporation of Illinois
Filed Dec. 5, 1968, Ser. No. 781,330
Int. Cl. B60b 7/02
U.S. Cl. 301—37      2 Claims

ABSTRACT OF THE DISCLOSURE

Decorative wheel disc, particularly adapted for bicycle wheels comprising a flexible disc formed with an annulus adapted to embrace the hub of a bicycle wheel and of a diameter adapted to substantially span the area within the rim of the wheel, said disc being formed with a radial slit extending from said annulus to its perimeter, and the combination thereof with a wheel of a bicycle. The disc is desirably formed with at least one and optionally more than one circular lines of perforation parallel to the outer perimeter whereby the area of the disc may be reduced to fit relatively smaller wheels.

---

The present invention relates to a novel decorative device particularly for bicycle wheels comprising a disc composed of flexible material such as paperboard and ornamented in such a manner that novel and pleasing effects will be obtained when the disc is combined with a bicycle wheel when the bicycle is driven. The disc is formed with a slit extending in a radial direction and suitably is formed in an arcuate or angular manner providing a leading edge whereby the disc may be radially threaded between the spokes of the conventional bicycle wheel so that it may be retained in position while the bicycle is being driven. The disc is also desirably provided with one or more concentric lines of perforation whereby the disc may be reduced in size to fit bicycle wheels of varying sizes as near as possible.

The objects and advantages of the present invention and its details of construction will be apparent from a consideration of the following specification and accompanying drawings wherein.

Figure 1:
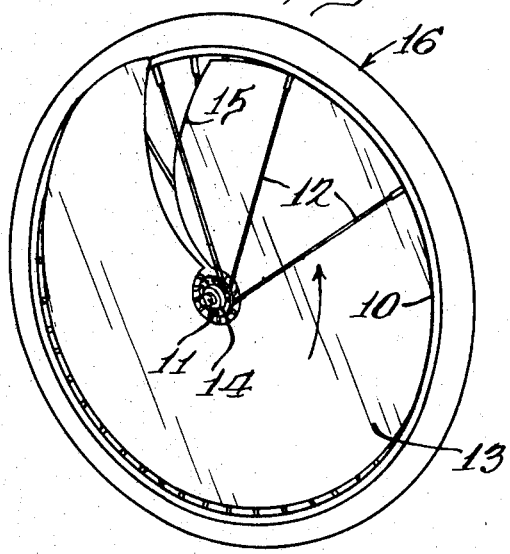
FIG. 1 is a perspective view of a bicycle wheel illustrating the manner of inserting the ornamental or decorative disc of the present invention between the spokes of the bicycle wheel.

Referring to the drawings, reference numeral 10 indicates the rim of a bicycle wheel and 11 the hub thereof. As is conventional, between the rim and hub there extend a plurality of spokes 12, and as is well known some of these spokes generate from one side of the hub 11 and some from the other side, all converging toward the rim 10.

Figure 2:
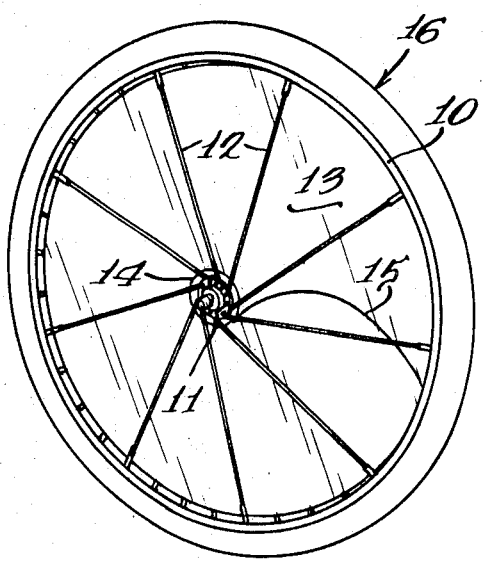
FIG. 2 shows the disc of the present invention fully disposed within the bicycle wheel underneath some of the spokes thereof whereby the disc is retained in operative position.

FIG. 1 illustrates the initial threading between the spokes 12 of the decorative disc 13 of the present invention which is formed with an annular opening 14 to embrace the hub 11 and with a radial slit 15 extending from the annulus 14 to the outer edge or perimeter of the disc 13. Desirably, the radial slit 15 is formed in an arcuate manner as shown in FIG. 1 although it may be angular, so as to provide a leading portion by which it may be readily threaded underneath some of the spokes 12. For this purpose, the disc 13 is of flexible material such as paperboard whereby it may be readily flexed and disposed beneath some of the spokes and over other of the spokes whereby it may be frictionally retained by spokes. Although FIGS. 1 and 2 show a single face of the bicycle wheel with a single one of our discs 13 engaged therein, if desired another disc may be engaged in a similar manner to the opposed side of the wheel, the wheel being generally indicated as 16.

To permit our discs to be made in an economical manner and so that they may be adjusted to bicycle wheels of different diameter, we provide our decorative discs 13 with one or more lines of perforation 17 concentric with the perimeter of the disc whereby the paperboard of the disc 13 may be broken or torn along the lines of perforation 17 to fit different sizes of bicycles. Generally, at the present time there are three sizes of bicycle wheels, so that two lines of perforation 17 are adequate. It will be understood, of course, that less or more than two lines may be employed for greater flexibility as to size when such is indicated.

Figure 3:
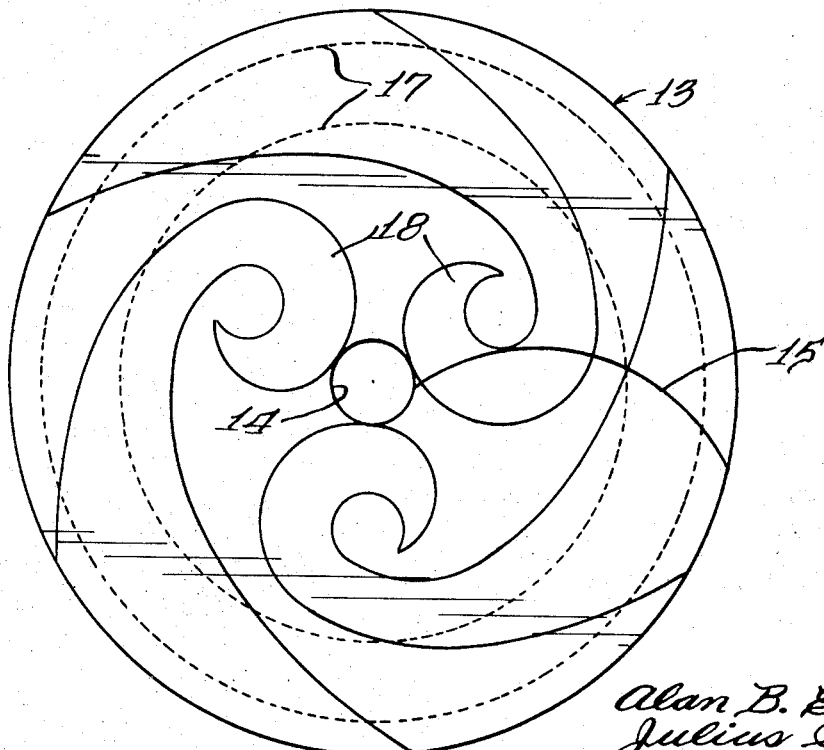
FIG. 3 is a plan view of the decorative disc of the present invention.

FIG. 3 indicates at 18 one style of ornamental decoration although it will be understood that a wide variety of patterns may be employed and different ones used for each of the wheels of a bicycle and different ones used on opposed faces of the wheels.

We claim:
1. A decorative device for a bicycle wheel comprising a flexible disc formed with an annulus adapted to embrace the hub of a bicycle wheel and of a diameter adapted to substantially span the area within the rim of the wheel, said disc being formed with an arcuate radial slit extending from said annulus to its perimeter and wherein the disc is formed of paperboard with at least one circular line of perforations parallel and adjacent to its perimeter whereby the area of the disc may be reduced to fit a relatively smaller wheel of a bicycle.
2. The device of claim 1 wherein the disc is formed with a plurality of concentric lines of perforation.

References Cited
UNITED STATES PATENTS

| | | | |
|---|---|---|---|
| 607,703 | 7/1898 | Peters | 40—129B |
| 2,621,081 | 12/1952 | Mann | 301—37SA |
| 3,317,246 | 5/1967 | Wester | 301—37SA |

RICHARD J. JOHNSON, Primary Examiner